April 19, 1938.  S. J. NORDSTROM  2,114,934
VALVE
Filed Jan. 4, 1932  5 Sheets-Sheet 1
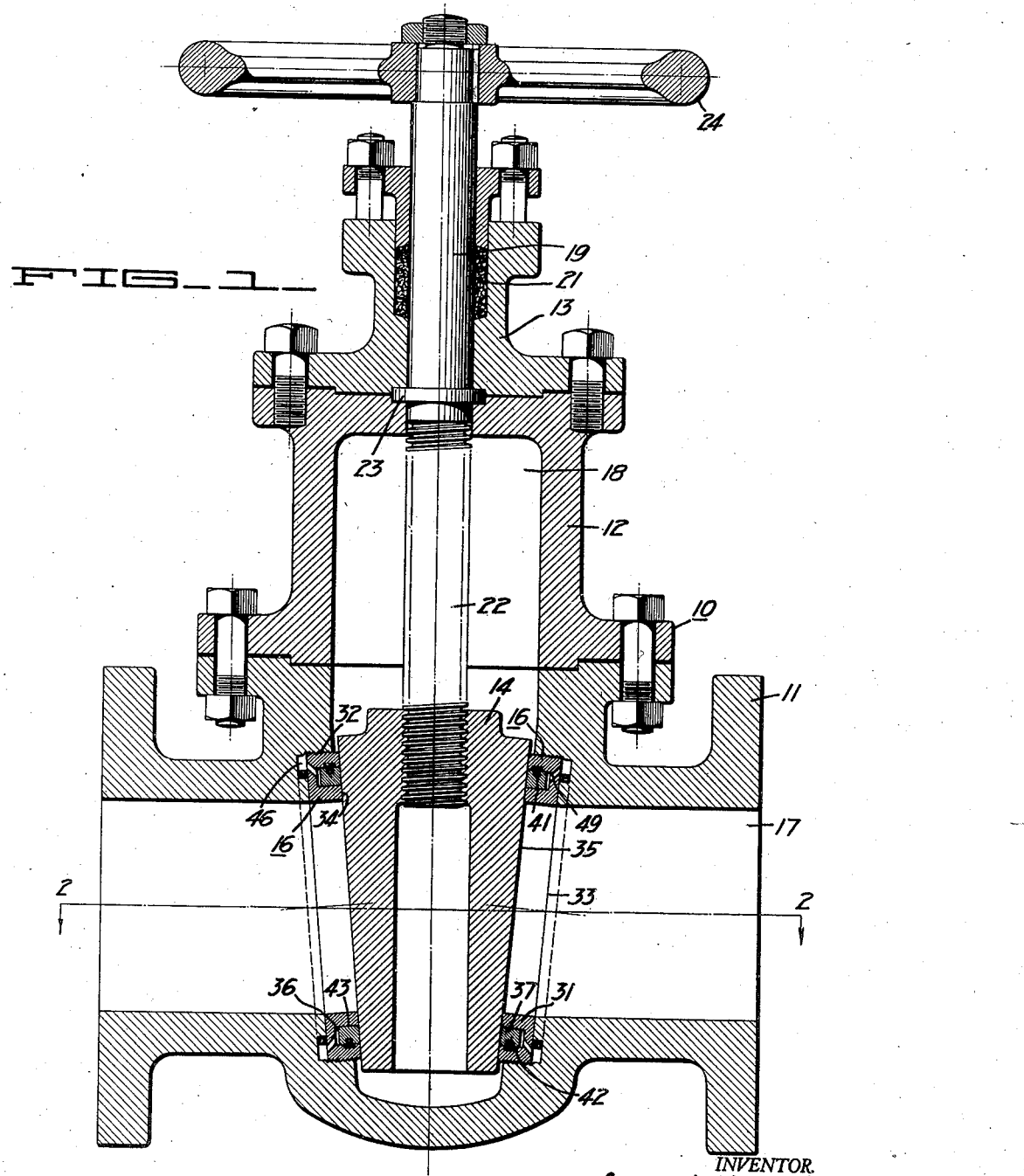
FIG_1_
INVENTOR.
Sven J. Nordstrom
BY White, Prost, Flehr & Lothrop
ATTORNEYS.

April 19, 1938.  S. J. NORDSTROM  2,114,934
VALVE
Filed Jan. 4, 1932   5 Sheets-Sheet 2
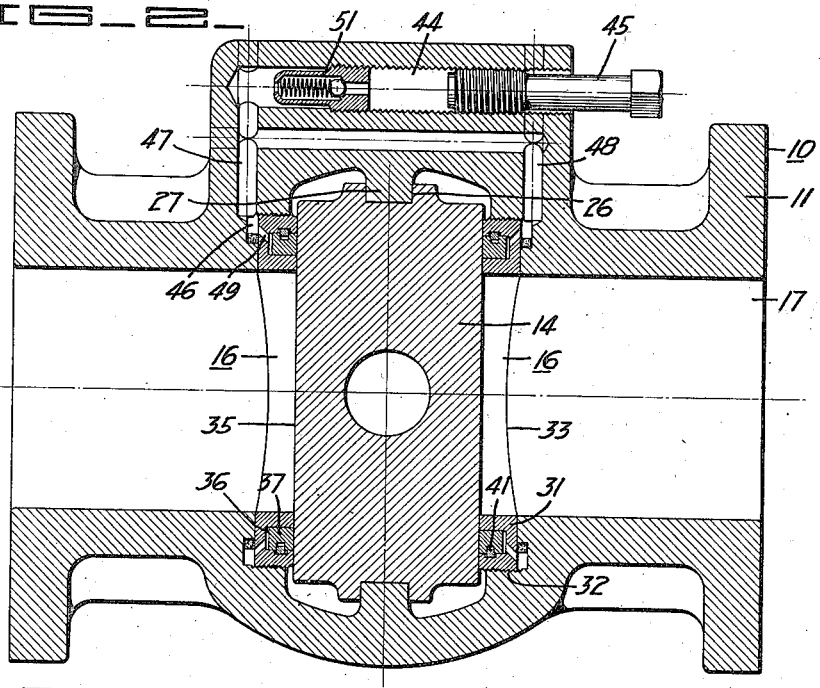
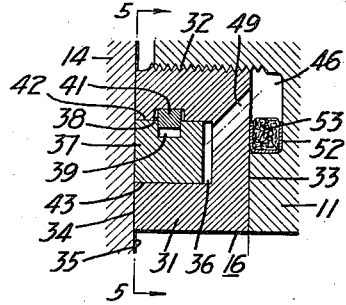
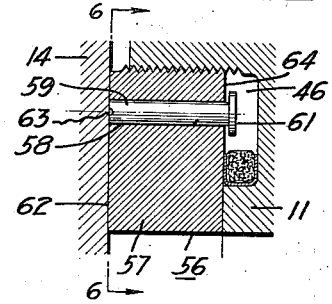
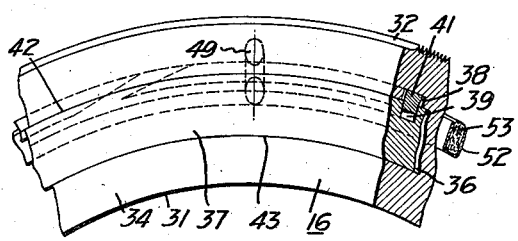
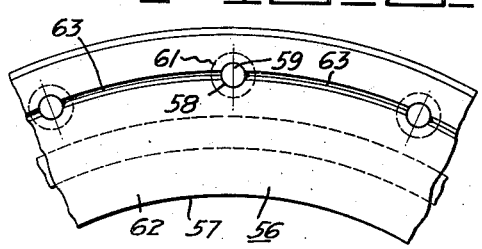
INVENTOR.
Sven J. Nordstrom
BY
White, Prost, Hebb & Lothrop
ATTORNEYS.

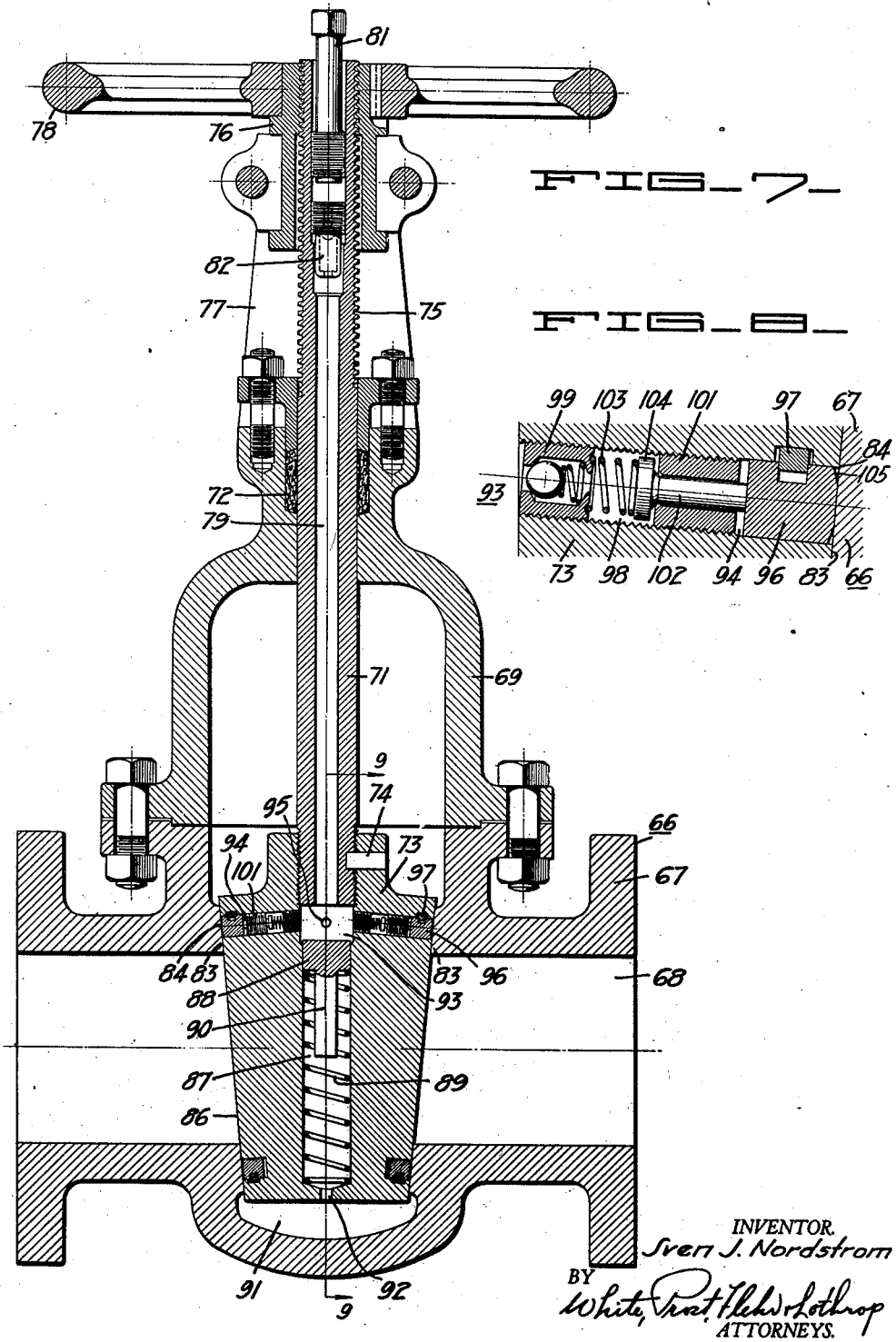

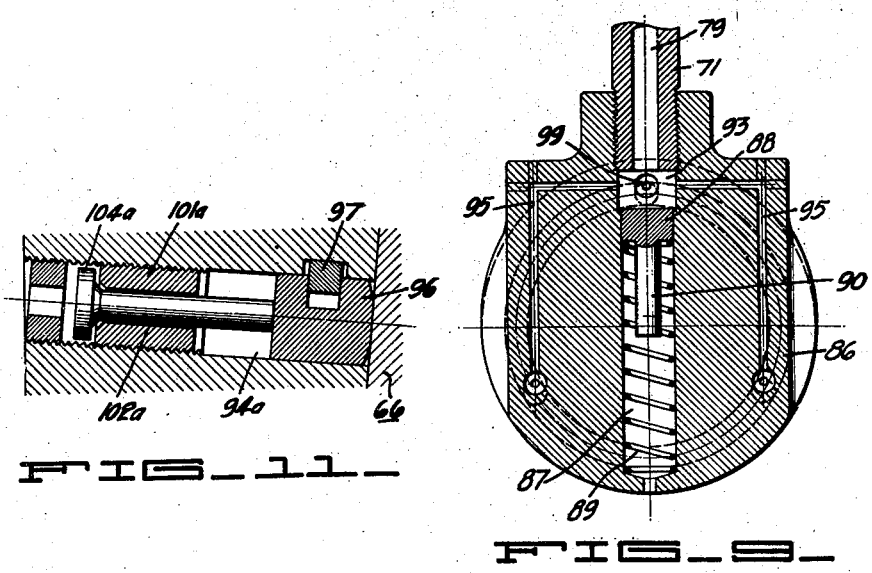
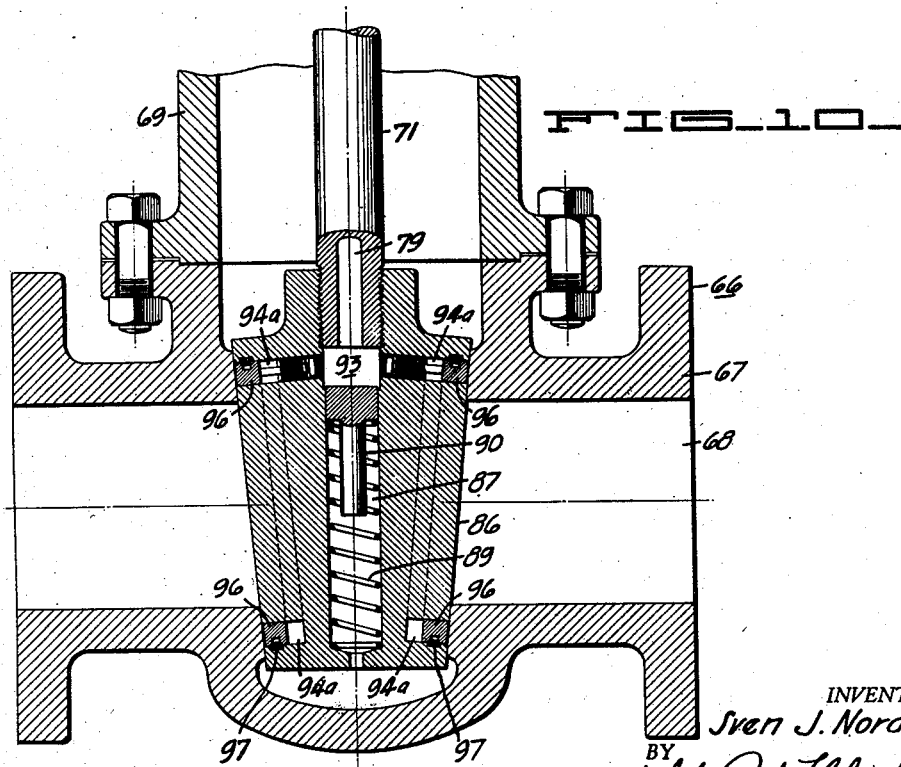

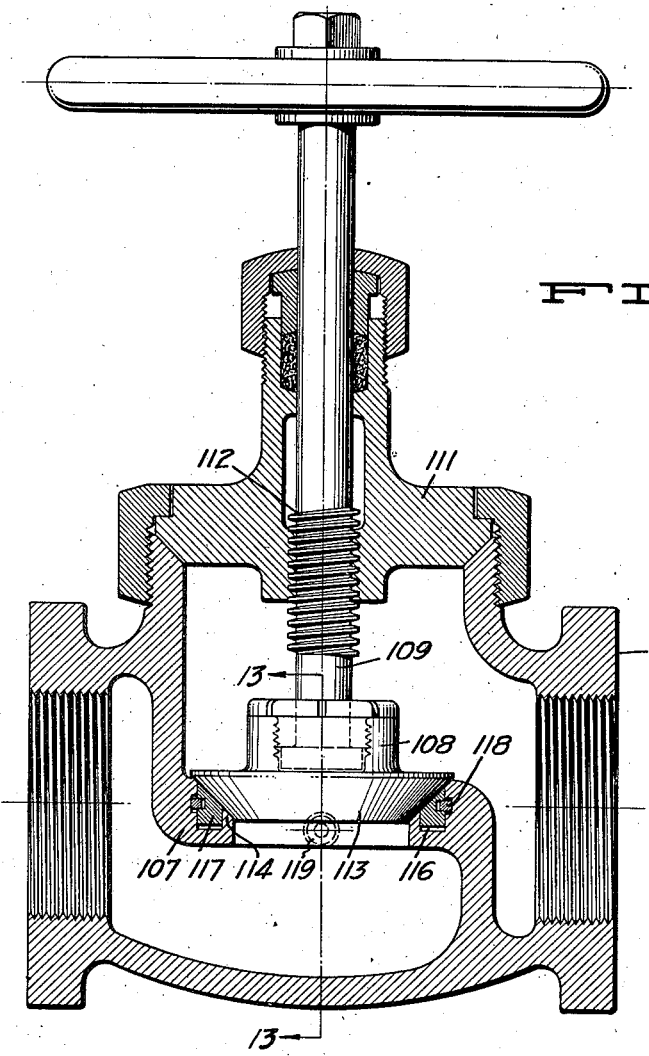
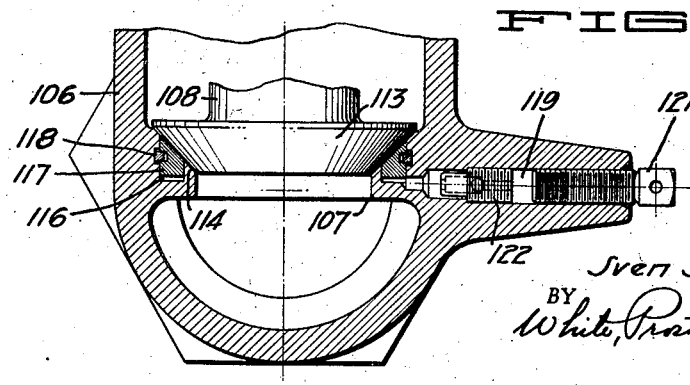

Patented Apr. 19, 1938

2,114,934

UNITED STATES PATENT OFFICE 2,114,934

VALVE

Sven Johan Nordstrom, Piedmont, Calif., assignor to Merco Nordstrom Valve Company, San Francisco, Calif., a corporation of Delaware Application January 4, 1932, Serial No. 584,634

24 Claims. (Cl. 251—51)

This invention relates generally to valves for controlling flow of fluid, particularly to valves utilizing means for supplying lubricant under pressure to the valve working surfaces.

As heretofore constructed the exposed lubricant grooves employed in lubricating the seating surface of valves will catch sediment, grit, scale and other foreign matter which is held by the lubricant, and when the valve is closed this grit is caught between the sealing surfaces thereby preventing proper seating thereof and scoring the same. Further lubricant channels have been employed which are relatively wide at the area of contact of the sealing surfaces, as for example, from ⅛ to ⅜ of an inch. When wide channels are exposed to the line fluid, the lubricant may be washed out resulting in waste of lubricant, and solid materials will accumulate in the lubricant cavities or grooves resulting in the disadvantages above pointed out. Heretofore it has not been possible to remove such accumulated sediment before closing of the valve, and leakage due to improper seating or scored or abraded seats has been common.

According to the present invention I provide means for removing accumulated sediment from the valve seating surfaces before the valve is closed or simultaneously with the closing of the valve. This is accomplished by providing retractible means for scraping the sealing surfaces, preferably in combination with means for supplying lubricant thereto to sweep away accumulated sediment. Further, by employing lubricating grooves in the valve seating surfaces which are very narrow I prevent the accumulation of solid material from the line therein.

It is an object of the invention to devise a pressure lubricated valve in which the lubricant distributing channels will not tend to cause detrimental accumulation of solid material from the line fluid on the valve working surfaces. By accumulation of detrimental solid material is meant such accumulation of solids as may render proper sealing engagement between valve working surfaces difficult if not impossible.

It is a further object of the invention to devise a valve of the above character which will effect utmost economy in the use of lubricant, and which will obviate the necessity of providing cut-off between certain channels for certan positions of the movable valve member.

It is another object of the invention to devise a lubricated valve in which viscous lubricant will be automatically forced between the valve working surfaces as the movable valve member is advanced upon its cooperating seat.

A further object of the invention is to devise a valve of the above character which can be of relatively simple construction, and which can be readily manufactured without undue cost.

Further objects of the invention will appear from the following description, in which the preferred embodiment of the invention has been set forth in detail in conjunction with the accompanying drawings. The appended claims are to be accorded a range of equivalents consistent with the state of the prior art.

Referring to the drawings:

Figure 1 is a side elevational view in transverse cross section, illustrating a valve of the gate type incorporating the present invention.

Figure 2 is a cross sectional view taken along the line 2—2 of Figure 1.

Figure 3 is an enlarged cross sectional detail, illustrating the construction of the seat employed in the valve of Figures 1 and 2.

Figure 4 is a view similar to Figure 3, but illustrating a possible modification in the construction of the seat.

Figures 5 and 6 are detail views taken along the lines 5—5 and 6—6 respectively of Figures 3 and 4, Figure 5 being partly in cross section.

Figure 7 is a side elevational view, in transverse cross section, showing a modified form of valve incorporating the invention.

Figure 8 is an enlarged cross sectional detail, illustrating the construction of a portion of the gate incorporated in Figure 7.

Figure 9 is a cross sectional detail taken along the line 9—9 of Figure 7, and showing the gate construction.

Figure 10 is a view similar to Figure 7, but illustrating a further modification.

Figure 11 is an enlarged cross sectional detail, illustrating the construction of a portion of the gate incorporated in Figure 10.

Figure 12 is a side elevational view, in transverse cross section, illustrating a globe type of valve incorporating the present invention.

Figure 13 is a cross sectional detail taken along the line 13—13 of Figure 12.

Referring to Figure 1, the valve illustrated therein consists of a casing 10, which for convenience in manufacture and assembly is shown formed of three parts, numbered 11, 12 and 13, respectively. Slidably disposed within the casing 10 there is a valve member 14, illustrated as being in the form of a tapered or wedge-shaped gate. Gate 14 is adapted to cooperate with a pair of stationary valve seats 16, shown in the preferred embodiments as a pair of inserted rings which are mounted within the casing in such a manner as to surround the main fluid passageway 17. In open position gate 14 is accommodated within chamber 18 formed principally by the intermediate casing part 12.

Gate 14 is adapted to be moved between open and closed positions by a rotatable valve stem 19, which is journalled in the upper casing part 13, and which is packed by a suitable packing 21. The inner portion 22 of stem 19 has a threaded engagement with gate 14. Longitudinal movement of stem 19 is prevented by suitable means such as a flange 23, which is part of the stem and which engages a recess formed in the casing. A hand wheel 24 has been shown fixed to the outer end of stem 19 to facilitate manual rotation. In order to properly guide gate 14 in its movements between open and closed positions, it is shown provided with parallel grooves 26 (Figure 2) which receive parallel guides 27 formed within the casing.

The pressure lubricant system for the valve includes a novel construction for the valve seats 16. Each of these seats has been illustrated as formed of a ring shaped member 31, made of suitable material such as a noncorrodible metal alloy. This ring has a threaded engagement as indicated at 32, with the main part 11 of the valve casing. One face of the ring is shown provided with an abutting contact with a shoulder formed on the valve casing, as indicated at 33. The other face of each member 31 is suitably machined to form a valve working surface 34, to cooperate with the corresponding valve working surface 35 formed upon the gate 14. Each member 31 is likewise provided with a groove 36, and in the preferred form of the invention, this groove is circular in contour, or the same contour as member 31. Slidably fitted within groove 36 and forming an elongated lubricant feed duct therewith is a filler member or ring 37 made of suitable material, such as a non-corrodible metal alloy, and which, as will be presently explained, can be characterized in its preferred form as being a "floating member" or "floating ring".

While relative movement between ring 37 and member 31 is desirable, means is provided to limit outward movement of member 37 with respect to member 31. Thus members 31 and 37 are provided with circumferential recesses 38 and 39 respectively, which serve to receive a split locking ring 41. Recesses 38 and 39 are of such widths as to permit ring 37 to move outwardly so that its outer face extends beyond the working face 34 of member 31 a certain distance, say for example one-sixteenth of an inch. The side walls of groove 36, and likewise the inner and outer peripheral surfaces of member 37, are preferably machined to provide an accurate fit so that the clearances between these surfaces, designated at 42 and 43 in Figure 3, are in the nature of machine clearances.

As suitable means for effecting introduction of lubricant under pressure, Figure 2 illustrates the main casing part 11 provided with a bore 44, threaded to receive the lubricant pressure screw 45. An annular duct 46, of substantial cross sectional area, is formed between each member 31 and the casing, and these ducts are connected with the inner end of bore 44 by lubricant ducts 47 and 48. Ducts 49 formed in each member 31 serve to communicate annular duct 46 with that part of each groove 36 which lies at the base of each groove behind the corresponding floating ring 37. A suitable check valve 51 can be positioned within bore 44, to prevent back flow of lubricant.

To afford a positive seal at the contact area 33 and prevent leakage of lubricant from duct 46 or of line fluid into this duct, suitable sealing means has been illustrated, consisting for example of an annular sheath 52 formed of sheet metal, and bent to be U-shaped in cross section. A compressed filler 53, of suitable material such as asbestos fiber, insures pressing of the side faces of member 52 against the adjacent machined surfaces of member 31 and the valve casing, to afford a positive seal.

Before explaining operation of the valve, it may be noted that the lubricant employed is preferably of highly viscous character, such as is ordinarily employed in lubricated valves, and which is available upon the market in stick form. Assuming now that gate 14 is in open position, and that viscous lubricant has been inserted in bore 44, turning down of pressure screw 45 causes this viscous lubricant to flow through ducts 47 and 48, into ducts 46, and from thence into grooves 36 through ducts 49. Further turning down of screw 45 builds up a lubricant pressure in the system, thus causing each of the rings 37 to be forced outwardly beyond the valve working surface 34, to their limiting positions, and excess lubricant escapes through the clearance provided at 42 and 43. Assuming now that the operator commences to close the valve by turning stem 19, the gate 14 will move downward until the faces 35 thereof contact with the relatively sharp edges of filler rings 37 which scrape off accumulated foreign material, and immediately before final closed position is reached, the valve working surfaces 35 of gate 14 contact with the outer faces of the floating rings 37. During the remainder of the movement of the gate to final closed position, floating rings 37 are forced back into their respective grooves 36, thereby displacing lubricant in channel 33 which is extruded through clearances 42 and 43, and delivered between the valve working surfaces. Thus when the gate is in fully closed position, a film of lubricant exists between the valve working surfaces 34, 35 and the face of ring 37, and this film upon each side of the gate is in a zone substantially surrounding the main passageway 17, to afford a sealed port effect.

The ring 37 is of sufficient width and has sufficient movement to supply the required amount of lubricant to the seating surfaces to sweep them clean and provide a lubricant seal thereon. The clearances 42 and 43 may be any desired width, but I prefer to maintain clearances of about one thousandth to five thousandths of an inch and up to $\frac{1}{32}$ of an inch to prevent accumulation of sediment therein.

A further characteristic inherent in the use of clearances 42 and 43, as distinguished from relatively wide lubricant channels, is that extrusion of viscous lubricant therethrough requires a relatively high pressure to be built up in the bases of grooves 36, and thus lubricant will not tend to flow to the valve working surfaces along a localized area, but will tend to flow throughout the lengths of clearances 42 and 43. Thus, clearances 42 and 43 act as pressure attenuating channels, to which viscous lubricant is supplied from the bases of grooves 36. The base portions of grooves 36 serve as primary lubricant feed ducts, which extend the lengths of clearances 42 and 43.

Another feature of the invention is that the two part construction for the seats 16 makes possible the formation of relatively narrow slots or clearances 42 and 43, in a manner applicable to commercial production. In the commercial production of valves it would obviously be impracticable if not impossible to cut a lubricant channel in the face of a valve seat having a width of say five thousandths of an inch. However, by forming the valve seats of two machined members, in this case members 31 and 37, channels of this character become commercially practical.

It has been previously pointed out that because of the floating character of rings 37, forcing of the valve member to final closed position causes automatic extrusion of the lubricant under high pressure to the valve working surfaces. A further inherent characteristic, by virtue of the floating character of rings 37, is that movement of these rings during operation of the valve tends to cleanse or clear clearances 42 and 43 of any obstructions which may be present from time to time, as for example, obstructions due to hardening of the lubricant.

In describing the preferred manner of manipulating my valve, it has been mentioned that the operator preferably turns down lubricant screw 45, to force rings 37 outwardly beyond the valve working surfaces 34, before moving the gate to closed position. However, either with or without manipulation prior to closing the valve, it is obviously possible at any time after the valve is closed, to inject the lubricant to the valve working surfaces by turning down screw 45. It should also be noted that clearances 42 and 43 are at all times in communication with a source of lubricant which can be placed under high pressure. In other words when the valve member is moved to open position, and the faces of the valve seats are exposed to line fluid, there is no "cut-off" effected between clearances 42 and 43 and the source of lubricant. Such cut-off is unnecessary in the present valve, due to the fact that the pressure attenuation effected by small clearances 42 and 43 precludes the possibility of extrusion of large amounts of lubricant through these clearances when the valve is opened.

In addition to the fact that the pressure attenuating characteristic of small clearances 42 and 43 causes lubricant extrusion to be distributed through their lengths, this characteristic likewise insures such a building up of pressure behind floating rings 37 (that is in the bases of grooves 36), that the forcing of these rings to their projected positions, when the valve is in open position, is always possible upon turning down screw 45. Thus if one of the floating rings 37 should be slightly jammed at one point along its circumference, upon turning down screw 45 when the valve is in open position, sufficient pressure can be built up to force this portion of the ring, as well as other portions of the ring, to projected position.

A modified seat construction, applicable to the valve of Figures 1 and 2, is illustrated in Figures 4 and 6. In this case seat 56 (corresponding to seat 16 of Figure 3) is formed of a member 57 (corresponding to member 31 of Figure 3) provided with a plurality of circumferentially spaced holes or apertures 58. A plurality of pins 59, made of suitable material such as non-corrodible metal alloy, are slidably fitted in openings 58, and are provided with heads 61. The valve working face 62 of seat 56 is interrupted by relatively fine grooves 63, these grooves connecting the edges of openings 58.

When the valve member is in open position and valve working surface 62 is exposed to the line fluid, lubricant pressure in recess 46 causes pins 59 to be forced outwardly, so that the outer ends of these pins project a certain amount beyond the valve working surface 62. At this time the pin heads 61 are in contact with surface 64, thus serving to shut off further extrusion of lubricant through the space between the walls of holes 58 and pins 59. Upon closing the valve, pins 59 are moved inwardly a certain amount, thus causing the lubricant to be extruded about these pins to the valve working surfaces and into the lubricant channel 63.

It is evident that certain characteristics of the modification described above with respect to Figures 4 and 6 are substantially the same as those inherent in the modification previously described. In both instances the viscous lubricant is extruded through a machine clearance between two interfitted members, although in the case of Figures 4 and 6, the clearances through which lubricant is extruded do not extend continuously throughout a zone surrounding the main valve passageway. However, in the case of Figures 4 and 6, a sealed port effect is produced by virtue of lubricant supplied to the interconnecting channels 63.

The modification illustrated in Figures 7 and 8 is similar to the modification of Figures 1 and 2, although in addition to other changes, in this instance provision is made for providing constant pressure lubrication over a long operating period. The valve in this instance includes a casing 66, formed of a main part 67 provided with fluid passageway 68, and an upper part 69. The valve stem 71 extends through casing part 69, and is packed by a suitable packing 72. The lower end of stem 71 is shown locked to the gate 73, by a threaded connection and by lock pin 74. The outer end of stem 71 is provided with a threaded portion 75, engaged by a rotatable nut 76. Nut 76 is journaled in a standard 77 mounted upon the casing, and is engaged by suitable means such as a hand wheel 78.

The lubricant in this instance is introduced through the stem 71, and therefore this stem is shown provided with a central bore or passageway 79. The upper end of this bore 79 is threaded to receive a lubricant pressure screw 81, and to also receive a check valve 82 to prevent back flow of lubricant. The seats employed with the valve of Figures 7 and 8 are designated at 83, and are integral with the main casing part 67. The valve working surfaces of these seats are indicated at 84, and the cooperating valve working surfaces of the gate 73 are indicated at 86.

Extending longitudinally of the gate 73 and alined with stem 71, there is a bore 87, forming the equivalent of a cylinder. Piston 88 is fitted within cylinder 87, and is adapted to be urged in one direction by compression spring 89. Bore or cylinder 87, below piston 88, is in communication with the well 91, at the bottom of gate 73, through port 92. Thus assuming that the fluid in well 91 is at line pressure, line pressure is always impressed upon the under side of piston 88. The upper end of cylinder 87 communicates with a chamber 93, which is likewise in communication with the lower end of bore or passageway 79. Depending portion 90, secured to piston 88, serves to definitely limit movement of the piston in one direction.

Formed within both of the opposite faces of gate 73 are the annular grooves 94, corresponding with grooves 36 of Figure 3. These grooves receive the floating rings 96 corresponding with rings 37 previously described, which are likewise loosely locked to the gate by means of members 97. Grooves 94 are connected to this chamber 93 by means of laterally extending threaded openings 98. Three openings can be provided for each groove 94, as shown in Figure 9, the two lower openings being connected to chamber 93 by ducts 95. Mounted within each opening 98, there are check valves 99, as for example of the ball type, which permits flow of lubricant from chamber 93 toward groove 94, but prevents back flow. In addition to the provision of such a check, a collar 101 is mounted within each opening 98, and each collar loosely receives a pin 102. Each pin 102 is urged outwardly by means of a compression spring 103, and is provided with a head 104, so that in projected position it serves as a check to prevent flow of lubricant to the corresponding groove 94. The outer end of each pin 102 engages the inner face of the corresponding floating ring 96 so that spring 103 not only urges pin 102 outwardly, but also the corresponding floating ring 96.

In the modification of Figures 1, 2, 3 and 5, the floating rings have been provided with faces, which for closed position form continuations of the valve working surfaces. In Figures 7 and 8 the outer faces of rings 96 are beveled as indicated at 105, for a purpose to be presently explained.

In operating the valve of Figures 7 and 8, a relatively large charge of viscous lubricant is forced through passage 79 into chamber 93, to force piston 88 downwardly against spring 89. After such a charge of lubricant has been introduced, it is retained under pressure in excess of the line pressure, by virtue of piston 88. Upon moving gate 73 to open position, rings 96 are projected both by virtue of the pressure of lubricant from chamber 93, and also by virtue of the urge of springs 103. While the gate is in open position, extrusion of lubricant about rings 96 is positively prevented by virtue of the check valve action of pins 102. Upon moving gate 73 to closed position, the outer faces of rings 96 first contact with the valve working surfaces 84 of stationary seats 83, and thereafter further movement of gate 73 towards closed position causes rings 96 to be forced inwardly to place the lubricant behind them, under high pressure, thus causing extrusion of lubricant to the valve working surfaces. Note in this connection that when rings 96 are being forced inwardly, check valves 99 are closed, so that the fluid pressure of lubricant behind rings 96 is confined to relatively small volumes. The valve therefore is sealed by the co-action of the outer faces of rings 96 which are resiliently pressed against the faces 84 of seats 83.

The beveling of floating rings 96 serves not only to minimize accumulation of scale or sediment upon the exposed ring edges when the valve is in open position, but also serves to automatically form enlarged closed circuit concentric channels along the contact area between the valve working surfaces, when the valve is closed. Such channels aid in distribution of lubricant throughout a zone surrounding passage 68, in the event lubricant does not extrude uniformly along the clearances between the rings 96 and the side walls of groove 94. Obviously such channels automatically disappear when the valve is opened and rings 96 are projected.

The modification of Figures 10 and 11 differs from that of Figures 7 and 8, in that grooves 94a, in which rings 96 are disposed, are substantially deeper, so that they can retain a relatively larger quantity of viscous lubricant. Likewise in this case grooves 94a are connected with chamber 93, by the two openings 98. Collars 101a are threaded into openings 93, and slidably receive pins 102a. The heads 104a of pins 102a are adapted to contact with the inner faces of collars 101a to serve as checks. When the valve is closed pins 102a are in the position shown in Figure 11, and lubricant in chamber 93 can flow to grooves 94a through the restricted passages formed by the clearance between pins 102a and collars 101a. Such communication is sufficient to maintain a pressure in grooves 94a, behind rings 96, which is substantially the same or not greatly less than the lubricant pressure in chamber 93. Now if the gate is moved to open position, rings 96 are uniformly forced outwardly, by virtue of expansion of the relatively large volume of viscous lubricant in grooves 94a, and by virtue of some additional lubricant flow which may occur through collars 101a. In this connection it should be noted that viscous lubricant is not substantially non-compressible like water, but can be compressed and will expand to a substantial degree due to entrainment of air therein. When rings 96 have been forced outwardly the heads 104a are caused by fluid pressure to seat upon collars 101a and prevent continued flow of lubricant while the valve is open. Closing of the gate forces pins 102a inwardly and again establishes communication between chamber 93 and grooves 94a.

Because of the relatively large volume of lubricant displaced by the inward movement of the rings 96 and the relatively limited clearance around the pins 102a, a considerable lubricant pressure will be created in the grooves 94a with the result that lubricant will not only be extruded through the space around the pins 102a into the chamber 93 but will also be caused to extrude around the rings 96 on to the working surface of the valve, as the gate is forced to final closed position.

In the modification illustrated in Figures 12 and 13, the invention has been applied to a valve of the globe type. In this case the valve includes a casing 106, formed to provide a stationary valve seat 107. Valve member 108 cooperates with seat 107, and is carried by the lower end of an operating stem 109. Stem 109 extends through the head 111 of the casing and has a threaded portion 112 to effect longitudinal movement. The valve working surface 113 of the valve member 108 is conical shaped and cooperates with the conical shaped valve working surface 114 formed upon stationary seat 107.

To effect lubrication, stationary seat 107 is shown provided with an annular groove 116, in which the ring 117 is slidably disposed. The outer face of ring 117 is likewise conical shaped, so that when the valve is closed, this surface is co-extensive with the contact area between the valve member and the stationary seat, thus forming a part of the valve working surfaces. Ring 117 is likewise limited in its sliding movement, by lock ring 118. Referring to Figure 13, viscous lubricant can be introduced into the base of groove 116, from a bore 119 formed in the valve casing.

This bore is threaded to receive the lubricant pressure screw 121, and also a check valve 122.

The operation of the modification illustrated in Figures 12 and 13 is substantially the same as that illustrated in Figures 1 and 2. Viscous lubricant can be extruded to the valve working surfaces by turning down screw 121, to cause extrusion through the clearances between ring 117 and the side walls of groove 116. Likewise when the valve is in open position, ring 117 can be forced to projected position, by turning down screw 121, following which if the valve is closed, the forcing of ring 117 to a position flush with the area of contact between the valve member and its associated seat, causes extrusion of lubricant under high pressure to the valve working surfaces, to effect sealing.

I claim:

1. In a valve, two relatively movable parts having cooperating valve working surfaces, one forming a valve member and the other a seat, and a pressure lubricating system for said valve, said system including a channel in one of said parts extending laterally from the area of contact between said surfaces, and means for forcing viscous lubricant through said channel, said channel having a width in said area of contact which is sufficiently small as to prevent detrimental accumulation of solid material from the line in the same, as exemplified by a width of from one to five thousandths of an inch.

2. In a valve, two relatively moving parts having cooperating valve working surfaces, one forming a valve member and the other a seat, and a pressure lubricating system for said valve, said system including a channel in one of said parts extending laterally from the area of contact between said surfaces, and means for forcing viscous lubricant through said channel, said channel being relatively elongated in a direction along the area of contact between said surfaces, and having a width in said area of contact which is sufficiently small as to prevent accumulation of sediment in the same, as exemplified by one to five thousandths of an inch.

3. In a valve, a casing having a passageway therethrough for flow of fluid, a seat formed within the casing, a valve member movably disposed within the casing and having a surface adapted to engage with a surface of the seat along an area of contact surrounding said passageway for closed position of the valve, at least one of said seat and said member being formed of separate interfitting members forming an elongated narrow slot therebetween extending along said area of contact and forming a circuit substantially surrounding said passageway in closed position of the valve, and means for causing viscous lubricant to be extruded through said slot.

4. In a valve, a casing having a passageway therethrough for flow of fluid, a seat formed within the casing, a valve member movably disposed within the casing and having a surface adapted to engage with a surface of the seat member along an area of contact surrounding said passageway for closed position of the valve, at least one of said seat and said member being formed of separate interfitting members relatively movable and forming an elongated slot therebetween extending along said area of contact and substantially surrounding said passageway in closed position of the valve, and means for supplying lubricant under pressure to force outwardly one of said interfitting members and be extruded through said slot.

5. In a valve, a casing having a passageway therethrough for flow of fluid, a seat formed within the casing, a valve member movably disposed within said casing and having a valve working surface adapted to engage with a surface formed on the seat member along an area of contact surrounding said passageway for closed position of the valve, at least one of said seat and said valve member being formed of separate parts, one of which is in the form of an inlaid ring forming a portion of the valve working surfaces, said parts being relatively movable and forming between them an elongated narrow slot substantially surrounding said passage for closed position of the valve and sufficiently narrow in said area of contact to prevent detrimental accumulation of sediment therein, and means for causing viscous lubricant to be extruded through said slot.

6. In a valve, two relatively movable parts having cooperating valve working surfaces formed thereon adapted to engage along an area of contact, one of said parts being formed with a groove extending along the area of contact, a floating member disposed within said groove and having a clearance with a wall thereof, and means for introducing viscous lubricant under pressure into said groove behind said floating member to urge said member outwardly and whereby lubricant can be extruded to said area of contact through the clearance between said member and a side wall of the groove.

7. In a valve, two relatively movable parts including a stationary seat, and a valve member adapted to be advanced upon said seat for closed position of the valve, said parts having valve working surfaces formed thereon adapted to engage along an area of contact for closed position of the valve, one of said parts having a groove formed therein extending along said area of contact, a floating member disposed within said groove and having a clearance with a wall thereof, means for limiting outward movement of said floating member to a position in which its outer face protrudes beyond the valve working surface of said one member, and means for introducing viscous lubricant into the groove behind said floating member and through the clearance between the floating member and groove.

8. In a valve, relatively movable parts including a stationary seat having an opening therethrough for flow of fluid, and a valve member adapted to be advanced upon said seat for closed position of the valve, said parts having valve working surfaces formed thereon adapted to engage along an area of contact surrounding said opening for closed position of the valve, one of said parts having a groove formed therein extending along said area of contact and forming a circuit surrounding said opening, a ring shaped member slidably disposed within said groove, means for limiting outward movement of said member to a position in which its outer face protrudes beyond the valve working surface of said one part, and means for introducing viscous lubricant into the groove behind said member and through the clearance between the ring and groove.

9. In a valve, two relatively movable parts including a stationary seat and a valve member adapted to be advanced upon said seat for closed position of the valve, said parts having valve working surfaces formed thereon adapted to engage along an area of contact for closed position of the valve, and means at said valve working surfaces operative automatically upon movement of said parts bringing said valve working surfaces into contact and cooperating with said valve working surfaces for forcing lubricant under pressure between said valve working surfaces.

10. In a valve, two relatively movable parts including a stationary seat having an opening therethrough for flow of fluid, and a valve member adapted to be advanced upon said seat for closed position of the valve, said parts having valve working surfaces formed thereon adapted to engage along an area of contact for closed position of the valve, said area of contact surrounding said opening, and means at said valve working surfaces operative automatically upon advancing said valve member upon said seat, for forcing lubricant under pressure between the valve working surfaces along a zone substantially surrounding said opening.

11. In a valve, two relatively movable parts having cooperating valve working surfaces, one forming a valve seat and the other forming a valve member adapted to be advanced upon the seat for closed position of the same, and a pressure lubricating system for the valve, said system including a channel in one of said parts communicating with the valve working surfaces and adapted to be exposed to the line for open position of the valve member, a chamber adapted to receive a charge of lubricant, means for maintaining said charge of lubricant under pressure, an opening serving to establish communication between said chamber and said channel, and pressure operated means for automatically disrupting such communication when the valve member is moved away from said seat to expose said channel to the line.

12. In a valve, two relatively movable parts having cooperating valve working surfaces, one forming a valve member and the other a seat, and a pressure lubricating system for the valve, said system including a channel in one of said parts communicating with the valve working surfaces, a chamber in said one part adapted to receive a charge of lubricant, means for maintaining said lubricant under pressure, and a lubricant flow control check serving to control communication between said chamber and said channel, said check being automatically closed upon opening the valve to expose said channel to the line.

13. In a valve, two relatively movable parts having cooperating valve working surfaces formed upon the same and adapted to engage along an area of contact, one of said parts being formed with a groove extending along said area of contact, a chamber formed within the valve and adapted to receive a charge of lubricant, means for maintaining the charge of lubricant within said chamber under pressure, said chamber having communication with the base of said groove, a floating member disposed in said groove, and means serving to control communication between said chamber and said groove and adapted to be actuated by movement of said floating member.

14. A valve including two relatively movable parts having cooperating valve working surfaces formed upon the same adapted to engage along an area of contact, one of said parts being formed with a groove extending along said area of contact and having a machine-clearance width, and mechanism arranged for actuation upon the final movement of one of said parts bringing said surfaces into contact to force viscous lubricant through said groove to said surfaces.

15. In a valve, relatively movable parts forming a valve member and a seat and having cooperating valve working surfaces, there being a lubricant passage in one of said surfaces and a closure or filler member for said groove adapted to protrude past the working surfaces in the open position of the valve and being adapted to be pressed substantially flush with said surfaces in closed position of said valve, a lubricant reservoir formed on one side of said filler member, whereby lubricant is extruded past the filler member upon closing of said valve, and means for supplying a viscous, plastic lubricant to said reservoir.

16. In a valve, a casing having a passageway therethrough for flow of fluid, a valve member for controlling said passageway, said member and casing having cooperating valve working surfaces, a lubricant groove formed in one of said surfaces and a filler member therein providing a clearance for passage of lubricant between the filler and a groove wall, a lubricant reservoir formed on one side of said filler, and means for supplying lubricant under pressure to said reservoir tending to press said filler against the opposed valve working surface.

17. In a valve, relatively movable parts forming a valve member and a seat and having cooperating valve working surfaces, and a pressure lubricating and sealing system for said valve, said system including a channel in one of said surfaces, a filler for said channel having limited transverse movement therein and adapted to protrude beyond said surface in the open position of said valve, said filler providing a minute clearance with a wall of said channel for passage of lubricant, a lubricant chamber formed on one side of said filler, and means for supplying lubricant under pressure to said chamber.

18. In a valve having separable seating surfaces, an insert movably located in one of said surfaces and having a clearance therewith, and lubricant means for resiliently urging said insert outward, the lubricant extruding through said clearance as said seating surfaces are brought together to seal said valve.

19. In a valve, a casing having a valve seat and a passageway therethrough for flow of fluid, a valve closure member having a seating surface cooperating with said valve seat for closing the valve, an insert located in a lubricant chamber in one of said surfaces and having a clearance therewith, and means for supplying lubricant under pressure to said chamber and through said clearance.

20. In a valve having separable seating surfaces, a movable insert located in a lubricant chamber in one of said surfaces and having a clearance therewith, means for supplying lubricant under pressure to said chamber, and means for resiliently urging said insert outwardly, closing action of the valve forcing said insert into said lubricant chamber to displace lubricant through said clearance.

21. In a valve having separable seating surfaces, a movable insert located in a lubricant chamber in one of said surfaces and having a clearance therewith, means for supplying lubricant under pressure to said chamber, means for resiliently urging said insert outwardly, and means for limiting outward movement of said insert, closing action of the valve forcing said insert into said lubricant chamber to displace lubricant through said clearance.

22. A valve as defined in claim 18 wherein said clearance is small enough to exclude detrimental solid material, being in the order of about one thousandth to five thousandths of an inch in width.

23. A valve as defined in claim 19 wherein said clearance is small enough to exclude detrimental solid material, being in the order of about one thousandth to five thousandths of an inch in width.

24. In a valve, a casing having a valve seat and a passageway therethrough for flow of fluid, a valve closure member having a seating surface adapted to be moved into contact with said valve seat for closing the valve, a groove formed in said valve seat, a movable filler member in said groove providing a clearance therewith, means for supplying lubricant to said groove for moving said filler member outwardly, and a stop to limit outward movement of said filler member.

SVEN JOHAN NORDSTROM.